March 19, 1940. C. J. DE L. DE LA SABLONIERE 2,194,180
CIRCUIT FOR AMPLIFYING ELECTRICAL OSCILLATIONS
Filed Oct. 23, 1937

INVENTOR
C. J. de L. de La SABLONIERE
BY H. S. Snover
ATTORNEY

Patented Mar. 19, 1940

2,194,180

UNITED STATES PATENT OFFICE 2,194,180

CIRCUIT FOR AMPLIFYING ELECTRICAL OSCILLATIONS

Christiaan Jan de Lussanet de la Sabloniere, Eindhoven, Netherlands, assignor, by mesne assignments, to Radio Corporation of America, New York, N. Y., a corporation of Delaware Application October 23, 1937, Serial No. 170,560
In Germany December 16, 1936

7 Claims. (Cl. 179—171)

This invention relates to a circuit arrangement for amplifying electrical oscillations and concerns more particularly an arrangement including at least one tube having a high internal resistance such as a screen-grid tube or pentode.

This invention envisages to construct the arrangement in question so that the voltage supplied by the tube having a high internal resistance to a load impedance, for instance to the grid-cathode path of a succeeding tube, is within wide limits independent of the value of the load impedance. This ratio is particularly advantageous if the load impedance, which may be constituted by the input impedance of a tube is variable.

In the circuit arrangement according to the invention a tube having a high internal resistance is for this purpose connected to the load impedance through a network which has the property that the input impedance is inversely proportional to the load impedance connected between the output terminals of the network.

Figure 1:
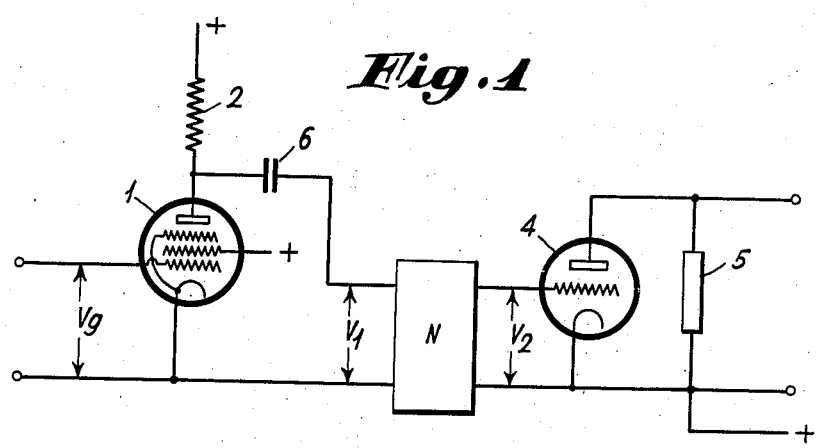

The invention will be more clearly understood by reference to the accompanying drawing, in which Fig. 1 represents one example of construction of the circuit arrangement according thereto.

Figure 2:
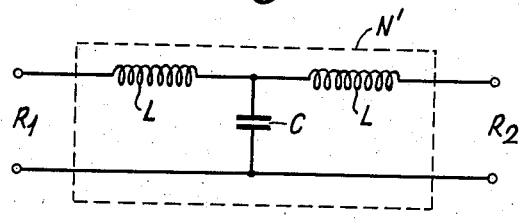
Figure 3:
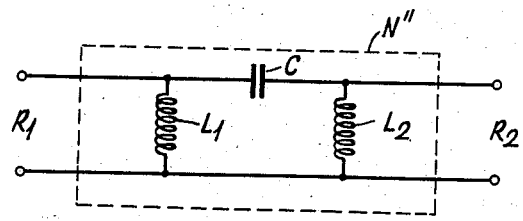

Figs. 2 and 3 illustrate examples of construction of the network to be used for the arrangement according to the invention.

Fig. 1 shows an arrangement according to the invention including a tube having a high internal resistance, viz. the pentode 1, to whose grid are supplied the oscillations to be amplified. The necessary energizing voltages for this tube are not represented in this figure, which includes only a choke 2 through which the anode voltage is supplied to the tube 1. The output circuit of the tube 1 comprises a network N having the property that the input resistance $R_1$ is inversely proportional to the resistance $R_2$ connected between the output terminals of the network. The resistance $R_2$ connected between the output terminals of the network is constituted by the resistance of the grid-cathode path of the amplifying tube 4, the oscillations being taken off from an impedance 5 included in the anode circuit of the tube 4. The condenser 6 in the anode circuit of the tube 1 has for its purpose to block the network N against the direct anode voltage.

By using a network possessed of the above property as a coupling element between the pentode 1 and the succeeding tube 4 it is ensured that the voltage supplied to the grid of the tube 4 is within wide limits independent of the impedance of the grid-cathode path of the tube 4.

This phenomenon may be explained as follows: The voltage to be applied to the network N being hereinafter represented by $V_1$, whereas $V_2$ represents the voltage set up in the output circuit of the network N and supplied to the grid of the tube 4. The voltage set up in the output circuit of the tube 1 and supplied to the network N depends on the slope of the tube 1, the voltage $V_g$ supplied to the grid of the tube in question and the output resistance $R_1$ of the tube 1, since the internal resistance of this tube is high relatively to the output resistance of the tube. If the tube 1 operates, for instance as a class A-amplifier, $V_1 = SV_g R_1$, whereas $$V_1 = \frac{1}{2}SV_g R_1$$

if the tube 1 acts as a class B-amplifier, $R_1$ being constituted by the input resistance of the network N, which resistance is inversely proportional to the resistance $R_2$ connected between the output terminals of the network N. The relation between $R_1$ and $R_2$ may be represented by $$R_1 = \frac{R_0^2}{R_2}$$

where $R_0$ represents the surge impedance of the network, which surge impedance is determined by the electrical constants of the network.

Furthermore the voltage $V_1$ supplied to the network may be represented by the equation $$V_1 = jR_0 i_2$$

wherein $i_2$ represents the current which flows through the resistance connected between the output terminals of the network and which in the example of construction illustrated is identical to the grid current flowing between the grid and the cathode of the tube 4.

It can be inferred from the three equations referred to:

$$V_1 = SV_g R_1 \qquad (1)$$

$$R_1 = \frac{R_0^2}{R_2} \qquad (2)$$

$$V_1 = jR_0 i_2 \qquad (3)$$

that the voltage $V_2$ which is set up across the resistance $R_2$ connected between the output terminals of the network and is consequently set up between the grid and the cathode of the tube 4 is determined by the equation $$V_2 = i_2 R_2 = SV_g R_0.$$

Thus we find that the voltage $V_2$ set up at the grid of the tube 4 is independent of the resistance $R_2$ and is determined only by the slope of the tube 1 and the surge impedance $R_0$ of the network N.

Figs. 2 and 3 show examples of construction of the network to be used for the arrangement according to the invention.

The network N' illustrated in Fig. 2 comprises between the input terminals the series connection of an inductance L and a condenser C, the latter being connected, in series with another inductance L, between the output terminals of the network. By giving the condenser C a suitable value with respect to the inductances L the value of the input resistance $R_1$ of the network is made inversely proportional to the resistance $R_2$ connected between the output terminals, $$R_1 \text{ being } \frac{R^2_0}{R_2}$$

and $$R_0 \text{ being } \sqrt{\frac{L}{C}}$$

provided the series connection of the condenser C and the inductance L be tuned to the frequency of the oscillations to be amplified.

Fig. 3 shows another example of construction of a network N'' to be used for the arrangement according to the invention. The constants $L_1$, C and $L_2$ of this network should also be chosen so that the input impedance $R_1$ is inversely proportional to the impedance $R_2$ connected between the output terminals of the network. The use of the network illustrated in Fig. 3 has the advantage that the energizing voltage for the anode of the tube 1 can be supplied through the inductance $L_1$, while the grid bias for the tube 4 can be supplied through the inductance $L_2$.

What I claim is:

1. A circuit arrangement for amplifying electrical oscillations with substantially constant gain comprising at least one tube of the multigrid type, a load impedance, and a coupling network interconnected between the output electrodes of the tube and the load impedance, said network having the property that its input impedance is inversely proportional to the load impedance which is connected between the output terminals of the network.

2. A circuit arrangement as claimed in claim 1, wherein the load impedance in question is constituted by the impedance of the grid-cathode path of a succeeding tube.

3. A circuit arrangement according to claim 1, wherein the network comprises a series connection of an inductance and a capacity and a second inductance which together with the said capacity are serially connected to the input electrodes of the succeeding tube.

4. A circuit arrangement according to claim 1, wherein the network comprises a series connection of an inductance and a capacity and a second inductance which together with the said capacity are serially connected to the input electrodes of the succeeding tube, the inductance and capacity included in the first series connection being tuned to the frequency of the oscillations to be amplified.

5. A circuit arrangement according to claim 1, wherein the network comprises a series condenser and a shunt impedance on each side of said condenser.

6. In a class A amplifier stage, the combination of a tube having the characteristic that its output current is substantially independent of its plate circuit load impedance, a utilization circuit, and an impedance inverting network connecting said utilization circuit with the output of said tube, such that the voltage gain measured by the ratio of the voltage developed across the utilization circuit to the signal voltage applied to the input of the tube is independent of the impedance of the utilization circuit.

7. An amplifier stage according to the invention defined in claim 6 wherein the utilization circuit is constituted by the input circuit of a succeeding tube.

CHRISTIAAN JAN DE LUSSANET
DE LA SABLONIERE.